United States Patent [19]

Goldberg

[11] Patent Number: 5,405,246
[45] Date of Patent: Apr. 11, 1995

[54] VERTICAL-AXIS WIND TURBINE WITH A TWISTED BLADE CONFIGURATION

[76] Inventor: Steven B. Goldberg, 10308 Laramie Ave., Chatsworth, Calif. 91311

[21] Appl. No.: 129,650

[22] Filed: Sep. 30, 1993

Related U.S. Application Data

[63] Continuation of Ser. No. 982,238, Nov. 25, 1992, abandoned, which is a continuation of Ser. No. 853,790, Mar. 19, 1992, abandoned.

[51] Int. Cl.$^6$ ............................................... F03B 3/12
[52] U.S. Cl. ............................. 416/227 A; 416/242; 416/DIG. 8
[58] Field of Search ............... 416/176, 223 R, 227 A, 416/DIG. 4–DIG. 6, DIG. 8, 242; 415/2.1, 4.2, 4.4, 905, 907; 290/55

[56] References Cited

U.S. PATENT DOCUMENTS

| | | | |
|---|---|---|---|
| 3,918,839 | 11/1975 | Blackwell et al. | 416/228 A |
| 4,449,053 | 5/1984 | Kutcher | 416/227 A |

FOREIGN PATENT DOCUMENTS

| | | | |
|---|---|---|---|
| 2452008 | 11/1980 | France | 416/227 A |
| 2609506 | 7/1988 | France | 416/227 A |
| 2948060 | 6/1981 | Germany | 416/227 A |
| 2165008 | 4/1986 | United Kingdom | 416/176 A |
| 1373860 | 2/1988 | U.S.S.R. | 416/176 A |

OTHER PUBLICATIONS

O. Ljungstrom, "L–180 Poseidon"– A New System Concept in Vertical Axis Wind Turbine Technology; Paper presented at the Third International Symposium on Wind Energy Systems, Aug. 26–29, 1980; pp. 333–355.

*Primary Examiner*—Edward K. Look
*Assistant Examiner*—James A. Larson

[57] ABSTRACT

A vertical-axis wind turbine includes two or more elongated blades connected to a rotor tower. The tower defines an axis of rotation and is linked, preferably via a gearbox or other torque-converting arrangement, to the shaft of a generator. Each blade is "twisted" so that its lower attachment point is displaced angularly relative to its upper attachment point. In a preferred embodiment, the radial distance of each blade from the axis of rotation varies between upper and lower attachment points such that the blade lies approximately along a "troposkein", which is the shape assumed by a string clamped at each end and spun about an axis passing through the ends of the string. The ratio between blade chord length and blade thickness is preferably constant over the length of each blade, with the middle of each blade approximately 80% as thick as its ends. The cross-section of the blades may be teardrop-shaped, shaped as an airfoil, rectangular, or curved in some other way.

8 Claims, 3 Drawing Sheets

FIG. 2
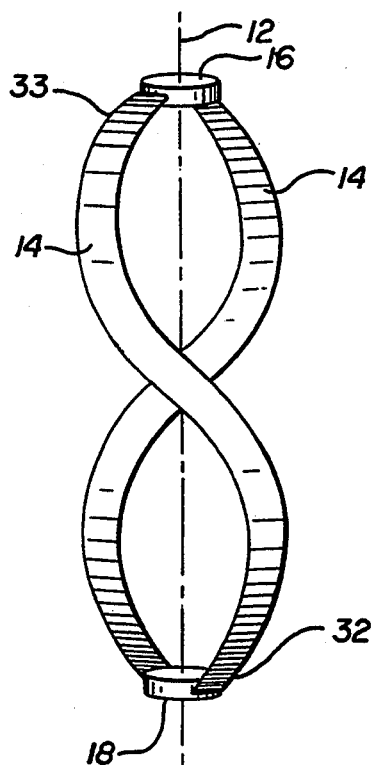
FIG. 3
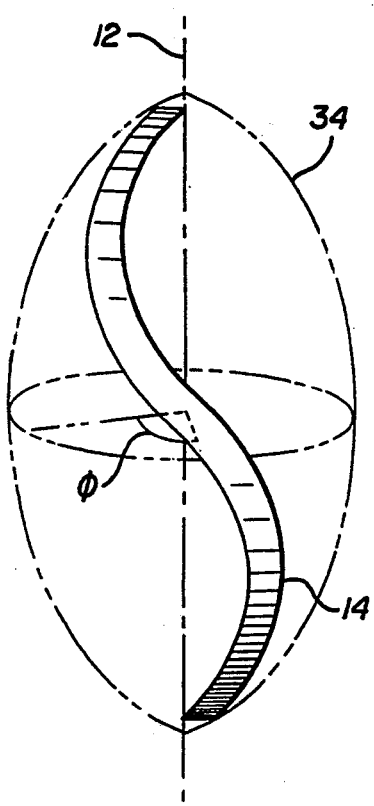
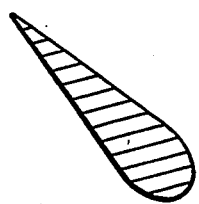
FIG. 4A
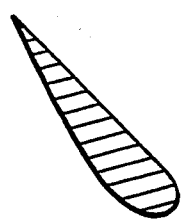
FIG. 4B
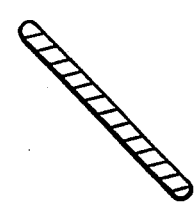
FIG. 4C

VERTICAL-AXIS WIND TURBINE WITH A TWISTED BLADE CONFIGURATION

This is a continuation of applications Ser. No. 07/982,238, filed on Nov. 25, 1992, abandoned which is continuation of Ser. No. 07/853,790, filed on Mar. 19, 1992, abandoned.

BACKGROUND OF THE INVENTION

1. Field of the Invention

This invention involves a vertical-axis wind turbine (VAWT) whose blades are twisted so that their chords do not lie on radial planes.

2. Description of Related Art

Wind-driven rotating devices have been used for centuries, if not millennia, to convert the kinetic energy of the wind for use in such applications as pumping water and grinding meal. Especially during the last two decades, people in energy-hungry industrialized countries have been forced to face the practical implications of the concept "non-renewable" as it applies to fossil fuels such as coal and oil, on which most of these societies still rely.

Wind-driven turbines have proven to be among the more promising alternatives to fossil fuels. In a wind turbine, the momentum of the wind is converted into rotary energy, which is used to turn a generator shaft to create electric current. The two main types of wind turbines are the horizontal-axis wind turbine (HAWT) and the vertical axis wind turbine (VAWT).

Both HAWT and VAWT designs use either or both of two aerodynamic forces—drag and lift—to create torque on the generator shaft. For drag-based designs, the wind "pushes" the blades of the turbine around; these designs thus work on the same principle as a rotary wind-speed indicator, in which the wind blows "cups" attached to arms that extend from a vertical shaft. In lift-based designs, the blades typically have an airfoil shape, so that, like an airplane's wing or a sailboat's sail, it "flies" at an angle toward the wind.

In a horizontal-axis wind turbine, a propeller is mounted on a supporting structure such as a tower and rotates about a horizontal shaft, which is typically linked with the generator shaft via a gearbox. Since the direction of the wind will normally change, the propeller as a whole must be able to rotate about a vertical axis in order to face the wind and have the greatest possible efficiency. This creates problems of balance and wear on the bearings that allow the propeller to swivel around the vertical axis, especially since the generator is typically also mounted at the top of the supporting structure must rotate with the propeller. HAWT designs, with their horizontal axis for the propeller blades, therefore resemble the well-known windmill, not only as to structure, but also as to disadvantages.

In a vertical-axis wind turbine (VAWT), blades of the turbine are arranged substantially vertically, and they rotate about a vertical axis which is either also the axis of rotation of the generator shaft or is linked via a geartrain to the generator shaft. A major advantage of VAWT designs is that they do not require any re-orientation when the wind changes directions.

Examples of existing HAWT and VAWT designs are shown in the following texts:

U.S. Pat. No. 1,592,417 (Burke, Jul. 13, 1926);
U.S. Pat. No. 1,835,018 (Darrieus, Dec. 8, 1931);
U.S. Pat. No. 4,087,202 (Musgrove, May 2, 1978);
U.S. Pat. No. 4,236,866 (Martinez, Dec. 2, 1980);
U.S. Pat. No. 4,264,279 (Dereng, Apr. 28, 1981);
U.S. Pat. No. 4,483,657 (Kaiser, Nov. 20, 1984);
U.S. Pat. No. 4,561,826 (Taylor, Dec. 31, 1985); and
U.S. Pat. No. 4,718,821 (Clancy, Jan. 12, 1988).

The primary goal of every wind turbine is to generate the maximum amount of torque to drive the generator shaft for a given wind speed. In other words, one wishes to maximize the efficiency of the wind turbine. At the same time, in order to achieve the goal of increasing the life-span of the turbine, it is important to minimize the stresses on the turbine structures, including the blades, the rotor, the various bearings, and especially on the geartrain, which is typically provided to convert the torque of the rotating blades to the proper RPMs for driving the generator shaft. As is so often the case, these two goals normally conflict.

In conventional VAWT designs, there are pronounced torque "peaks" at various angular positions for each blade. Additionally, each blade in conventional VAWT designs has several "null" positions, that is, angular positions at which it generates little or no torque at all. This makes the problem of torque load-unload cycles even worse. Each torque peak represents a peak load not only on the blades but also on the bearings and geartrain. Except for the turbine shown in the Darrieus patent, existing VAWT designs typically also include several other fixed or moving mounting or blade-adjustment structures, each of which is also subject to the non-uniform torque and are additional elements that can wear out and fail.

Torque peaks also reduce the efficiency of existing wind turbines, since energy that could be used to generate torque is dissipated as bending moment on the blades. Ideally, therefore, the torque profile for each blade should be as "smooth" as possible over the 360° range of motion of the blade.

The problem of fatigue-induced failure is made worst by the stress-inducing loads being periodic. Even low-RPM turbines will typically be subjected to tens of thousands of load-unload cycles during the course of a day. The more torque peaks and "null" points are present over the 360° rotation of each blade, the worse is the risk of fatigue failure.

Yet another disadvantage of many wind turbines is that they are not self-starting. As such, they require closer monitoring than if they were self-starting, or they require additional starting power and related equipment. The relatively high moment of inertia of windmills such as the Clancy device not only limits the achievable rotational velocity of the blades, but also reduces or precludes their ability to self-start.

It is accordingly an object of this invention to provide a self-starting vertical-axis wind turbine that has high efficiency and a low moment of inertia, yet has greater reliability than existing VAWT designs, with a blade configuration that allows it to generate torque more smoothly than existing designs while reducing the degree of wasteful bending moment on the blades and avoiding the need for additional, failure-prone struts, stabilizers, and linkages.

SUMMARY OF THE INVENTION

In the VAWT according to the invention, two or more elongated blades are connected to a rotor tower, which defines an axis of rotation and which is linked, preferably via a gearbox or other torque-converting arrangement, to the shaft of a generator. Each blade is "twisted" so that its lower attachment point is displaced angularly relative to its upper attachment point.

In a preferred embodiment of the invention, the radial distance of each blade from the axis of rotation varies between upper and lower attachment points such that the blade lies approximately along a "troposkein", which is the shape assumed by a string clamped at each end and spun about an axis passing through the ends of the string.

The ratio between blade chord length and blade thickness is preferably constant over the length of each blade, with the middle of each blade approximately 80% as thick as its ends. The cross-section of the blades is preferably teardrop-shaped, but may also be shaped as an airfoil, a rectangle, or some other profile.

BRIEF DESCRIPTION OF THE DRAWINGS

FIG. 2 illustrates a preferred blade/hub configuration in the VAWT according to the invention;

FIG. 3 illustrates geometrically one advantageous design of the "twisted" blades used in the VAWT according to the invention;

FIGS. 4A, 4B and 4C show examples of different possible cross-sectional profiles for the blades used in the turbine according to the invention.

DETAILED DESCRIPTION

Figure 1:
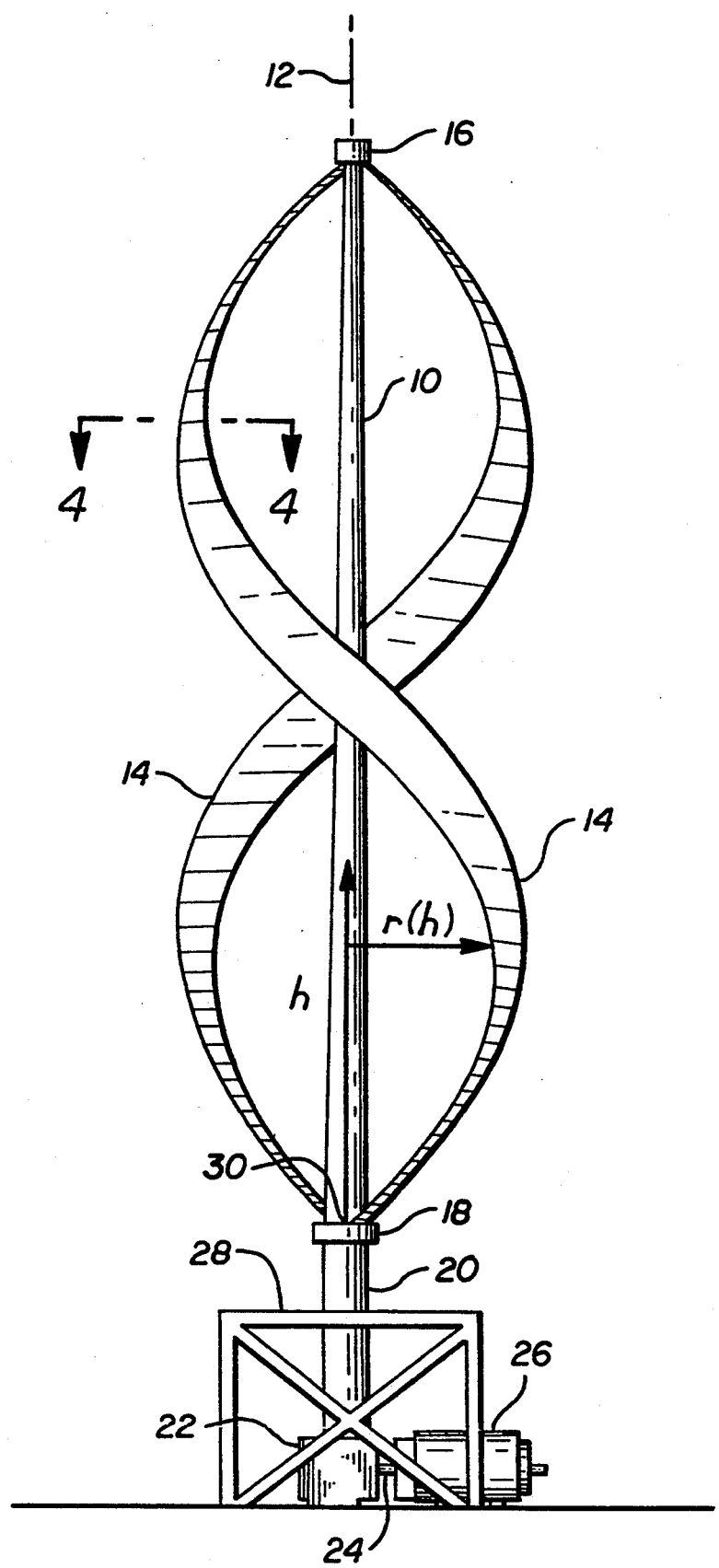
FIG. 1 is a schematic illustration of a vertical-axis wind turbine (VAWT) with "twisted" blades according to the invention.

FIG. 1 shows the general configuration of a vertical-axis wind turbine according to a preferred embodiment of the invention. This VAWT includes a rotor tower 10 that extends mainly vertically, with a center line that defines an axis of rotation 12 for the turbine. The height of the rotor tower 10 may be varied and chosen according to the criteria used to determine the height of conventional VAWT designs; factors to be considered include the terrain and physical characteristics of the intended site, the expected range of wind strength, and the construction materials used.

The upper and lower ends of each of a plurality of rotor blades 14 are attached to the rotor tower 10, preferably via an upper hub 16 and a lower hub 18, respectively. The blades 14 are connected to or linked with a driving shaft (not shown) contained within a tower base 20. The driving shaft transmits torque from the rotating blades via a gearbox 22 to a shaft 24 of an electrical generator 26. A rotor base 28 is preferably also included to stabilize the rotor tower 10 and to absorb the lateral forces that the wind applies to the turbine.

The rotor tower 10 preferably forms or is rigidly connected to the internal shaft that extends into the gearbox 22, whereby the rotor tower 10 will rotate along with the blades 14. Other arrangements are also possible in which the rotor tower is stationary and other shafts and linkages are provided to transmit the torque from the blades to the generator shaft.

The rotor tower 10 and the blades 14 may be made of any materials that have sufficient resistance to fatigue failure even when subject to long-term periodic loading at the RPMs at which the turbine is expected to operate (which will depend on the expected wind strength and regularity at the turbine site, on the mechanical and electrical properties of the gearbox 22 and generator 26, etc.). Glass- and carbon-fiber reinforced polymers, composite and laminate materials, wood, as well as metals such as aluminum (either solid or in profiles) are examples of suitable materials. The tower 10 and blades 14 need not be manufactured of the same materials.

Depending on the environment in which the wind turbine is installed, erosion from sand and build-up of insects on the blades may be problems. It is therefore possible to construct the blades of more than one material, such as using an aluminum skin on a fiberglass blade body. In areas in which icing is an anticipated problem, it is also possible to provide each blade with a deicing device such as an inflatable bladder running along or near at least part of the leading edge of the blade. In such case, a suitable conventional bladder-inflating system will be provided. Such deicing arrangements are well-known to designers of airplane wings, and are therefore not discussed further here.

This invention relates primarily to the configuration and shape of the blades 14 and their relation to the rotor tower 10, and not to the gearbox 22, the generator 26, or the linkages or shafts necessary to transmit torque to the gearbox 22 and generator 26. Any conventional transmission system for the generator 26 can be used. For example, depending on the generator and the degree of torque reduction required, the rotating shaft (which may be the rotor tower 10) could be connected directly to the generator shaft 24. Typically, however, some form of gearbox 22 will be preferred in order to increase the RPMs of the generator. In fact, however, the VAWT according to the invention does not require the generator at all if the invention is needed to do other work (such as pumping water) not related to the generation of electricity.

In the preferred case in which the rotor tower 10 rotates with the blades 14, the tower 10 is mounted via a bearing 30 in the tower base 20.

FIG. 2 illustrates one of the unique features of this invention. In FIG. 2, the upper and lower hubs 16, 18, are illustrated by way of example only as being cylinder-like. The hubs 16, 18 may, however, have a polygonal or irregular cross-sectional shape. It is also possible according to the invention to omit the hubs 16, 18 altogether, so that the blades 14 are attached directly to the rotor tower 10, or to attach the blades to the rotor tower using some other structure. The ends of the blades should be attached close to the axis of rotation, however, preferably no more than one diameter of the rotor tower away from the axis of rotation.

Such close attachment makes possible the use of sturdy and secure compact hubs or other means of attachment, and avoids all need for struts, which are not only failure-prone but also add to the moment of inertia of the rotating mass of the turbine. It is not necessary for the upper and lower mounting or attachment points of the blades to be equally close to the axis of rotation (the bottom of the rotor tower 10 may, for example, be thicker than its top).

As FIG. 2 illustrates, the lower end 32 of each blade 14 is attached to the lower hub 18 (if provided) so that it is angularly displaced, for example by 90°, relative to the attachment point of the upper end 33 of the same blade 14. In other words, each blade is "twisted" 90° with angular position being measured about the axis of rotation 12. As FIG. 2 also illustrates, the upper portion of each blade 14 is shaped such that it initially angles away from the point at which it will be attached to the lower hub 18 and then bows back towards the point of attachment to the lower hub. Similarly, the bottom portion of each blade 14 initially angles away from the point at which it will be attached to the upper hub 16 and then bows back towards the upper hub. As such, the upper and lower portions of each blade 14 form a substantially S-shaped blade.

In FIGS. 1 and 2, the illustrated embodiment has only two blades 14. Two blades are sufficient to generate torque, and such an even number of blades evenly distributed around the rotor tower reduces potential problems of imbalance. Three or more blades may, however, also be used, and as long as the hubs (or other attachment devices) allow space enough for attachment of the chosen number of blades, the upper and lower ends of each blade can still be displaced angularly relative to one another. The number of blades needed may be determined by experiment, but increasing the number of blades will usually also increase the amount of turbulence in which a given blade must operate (many blades "crowded" around the tower will create turbulence for each other) and may reduce efficiency.

It is furthermore not necessary for the degree of angular displacement, that is, "twist" to be 90°. For example, the lower ends of each blade 14 could be twisted more or less than 90° relative to their corresponding upper ends, and it is not necessary to avoid "angular overlap" of the blades. For example, if six blades are used and are spaced evenly around the turbine, with a 90° twist for each blade, there would be a 30° region of overlap for each pair of adjacent blades.

The opposite arrangement, with "angular gaps", is also possible: in the two-blade configuration shown in FIGS. 1 and 2, for example, there is no angular overlap at all, but rather there are two 90° sectors that do not include any portion of either blade. Of course, it is also possible according to the invention for the angular attachment point of the lower end of each blade to be the same as the angular attachment point of the upper end of the adjacent blade. For example, in a four-blade turbine according to the invention, the blades could be spaced 90° about the rotor tower 10, with the degree of twist also 90°.

As FIG. 1 illustrates, the distance of the blade 14 from the axis of rotation 12 varies from a small amount at each end to a maximum degree of "bulge" approximately half-way between the two ends of the blade. In other words, the horizontal (more accurately, radial) distance from the axis of rotation of the blade 14 at any vertical point h can be defined approximately as a radius function r(h) of the height h, where r(h) represents the radial distance of the blade 14 from the axis of rotation 12 for any given height h.

In a preferred embodiment, each blade is configured so that its radius function r(h), that is, the distance of the blade from the axis of rotation 12, is approximately that of a "troposkein," which is the shape assumed by a string that is clamped at each end but is rotated freely about an axis that lies in the plane of the rotating string. As an example, if the ends of a string are attached, spaced apart, to a shaft and the shaft is rotated, the string will "curve" or "bulge" out from the shaft, and the shape the string describes will at least closely approximate that of a troposkein.

Note that the angle each end of the rotating string makes with the shaft will depend on the length of the string relative to the distance between its attachment points: for given attachment points, the longer the string, the more it will "bulge" out from the shaft, that is, the greater will be the angle at which the end intersects the shaft; the same is true with respect to the curvature of the blades relative to the rotor tower.

The troposkein shape represents the minimum-energy configuration of an ideal rotating string (for which internal friction, air resistance, and other factors not related to the mass properties of the string are disregarded). It is hypothesized that configuring each preferably narrow blade 14 so that its radius function r(h) approximately describes a troposkein minimizes or at least greatly decreases the bending moment and stresses on the blade 14 as it rotates in the turbine.

The length of each blade 14 may be varied depending on such factors as the expected operating conditions for the turbine and the mass and other properties of the chosen manufacturing material for the blades. As is explained above, the angle at which the blades intersect the rotor tower 10 therefore will vary depending on the length of the blade. In order to reduce bending moment on the ends of the blades at their mounting points, the slots, clamps, or other fasteners used to attach the blades to the hubs 16, 18 or to the tower 10 should therefore preferably be mounted in or on the rotor tower in such a way that the blade ends are attached at the natural intersection angle for a "troposkein". This angle may be determined by calculation or experiment before manufacture.

Alternatively, the blades 14 may be attached to the tower 10, either directly or via hubs 16, 18, using a hinge or pivot arrangement. Although such hinge arrangements will constitute additional elements subject to wear and failure, they would eliminate vertical bending moments on the ends of the blades as they rotate.

If a troposkein blade configuration is desired in a particular application, the shape of the troposkein used to design the blades will depend on the length and mass properties of the blades, and any conventional method may be used to calculate the proper blade length and radius function (and thus the shape of the "bulge" of each blade). Calculation may, for example, be simplified by approximating the blades with corresponding, infinitely thin strings or strips with similar mass and material properties as the blades to be used.

One should keep in mind, however, that although the blades will typically have some flexibility and should be secured against rotating about the axis of rotation relative to their points of attachment to the hubs or rotor tower, they should not be flexible as ideal strings. It is, for example, preferable for the blades to be as rigid as possible consistent with the goals of reducing rotational inertia, manufacturing complexity and cost, and resistance to fatigue failure. In other words, the stiffer the blades are, the better they will typically be able to transmit torque, but stiffness is only one factor that the designer must consider in choosing which of the many alternatives provided for by the invention will best suit the needs of a particular installation.

Other radial blade configurations besides the troposkein may be used according to the invention. The advantages of the "twisted" blade configuration according to the invention do not depend on the use of a troposkein shape.

FIG. 3 illustrates geometrically a preferred generating surface for each blade 14. In FIG. 3, a surface of rotation is indicated generally with the reference number 34. The surface 34 shown in FIG. 3 is preferably the surface of rotation of a troposkein. It may, however, be any other shape, for example, and oblate spheroid, an ellipsoid, or some other surface of rotation. In one test prototype of the invention, for example, prototype blades were designed using the outer surface of an American football as a generating surface; this also illustrates that the surface of rotation used to define the blade profile need not be "rounded" at each end; indeed, as is discussed above, troposkein-configured blades will normally not be attached to the rotor tower 10 at right angles.

As FIG. 3 illustrates, each lateral cross-sectional shape of each blade 14 is preferably formed substantially as a strip cut from the surface of rotation 34, with the top and bottom ends extending approximately to the axis of rotation 12. The degree of twist of the blade is indicated as the angle $\phi$ and as is pointed out above, $\phi$ can be varied depending on the number of blades and the degree of angular overlap or gap, if any, desired between adjacent blades.

One should note that the blades in the VAWT according to the invention are "twisted" in the sense that the chord of each blade is substantially tangent to (or has a substantially constant angle relative to) a surface of rotation along a generating line traced on the surface of rotation; the top and bottom portions of the generating line intersect the axis of rotation but lie in different radial planes (half-planes whose edge coincides with the axis of rotation). The "twisting" involved is therefore not the same as simply taking a strip cut from a flat sheet of material and twisting its bottom portion relative to its top portion.

FIGS. 4A through 4C illustrate possible longitudinal profile shapes for each blade 14. In FIG. 4A, the blade cross-section is substantially teardrop-shaped, so that it is substantially symmetric about its chord (the line from its leading edge to its trailing edge); in FIG. 4B, the cross-section resembles that of an airfoil; and in FIG. 4C, the cross-section is generally rectangular so that the blade is mainly flat. The cross-section of the blades may be teardrop-shaped, but may also be shaped as an airfoil with any desired aspect ratio, or with the Klein-Fogelman configuration (even modified, with a sharpened leading edge, which tests indicate may improve the ability of the blades to sustain their effect over the full 360° of rotation). The blades' cross-section may also be rectangular, or curved in some other way. Conventional calculations and experimental methods may be used to determine the optimal blade cross-section for given applications, manufacturing methods and budgets, and choices of materials.

The chord and/or thickness of each blade may be kept constant or may change over the length of the blade. In order to increase strength at the points of greatest stress while reducing the moment of inertia of the rotating mass of the VAWT according to the invention, the blades are, however, preferably thicker and wider at each end than they are in their middle portions. In a preferred embodiment, the ratio of chord to thickness is substantially constant over the length of each blade 14, with the blade chord decreasing at the middle portion of the blade to about 70–90% (preferably approximately 80%) of the chord at each end. Uniform cross-sectional blade shape may, however, in many cases reduce manufacturing complexity and cost.

A 100:1 reduced scale model of a "twisted blade" configuration according to the invention was compared with a similarly scaled model of a conventional "non-twisted" blade according to the commonly used Darrieus configuration (see the above-mentioned U.S. Pat. No. 1,835,018). The twisted blade had a "teardrop" cross-sectional shape, as is illustrated in FIG. 4A. Both the standard and twisted blades were made by laminating thin strips of hardwood into the respective design, and were then carved and sanded to the final shape.

In each case, the ends of test blades were mounted on a shaft with a radius of 2.4 mm. For different angles relative to the wind, for an approximately constant wind speed, the torque generated by each blade on the shaft was measured using a torque meter consisting of a spring attached to the shaft, whereby the moment arm—the radius of the shaft, was substantially constant.

The stiffness of the spring used in the torque meter constructed for the experiment was such that it elongated approximately 0.75 mm per gram "weight" hung from it (assuming typical gravitational acceleration). The spring was attached to the shaft so that it resisted the torque applied to the shaft by the blade. The elongation of the spring was therefore directly proportional to the amount of torque applied by each blade.

Figure 5:
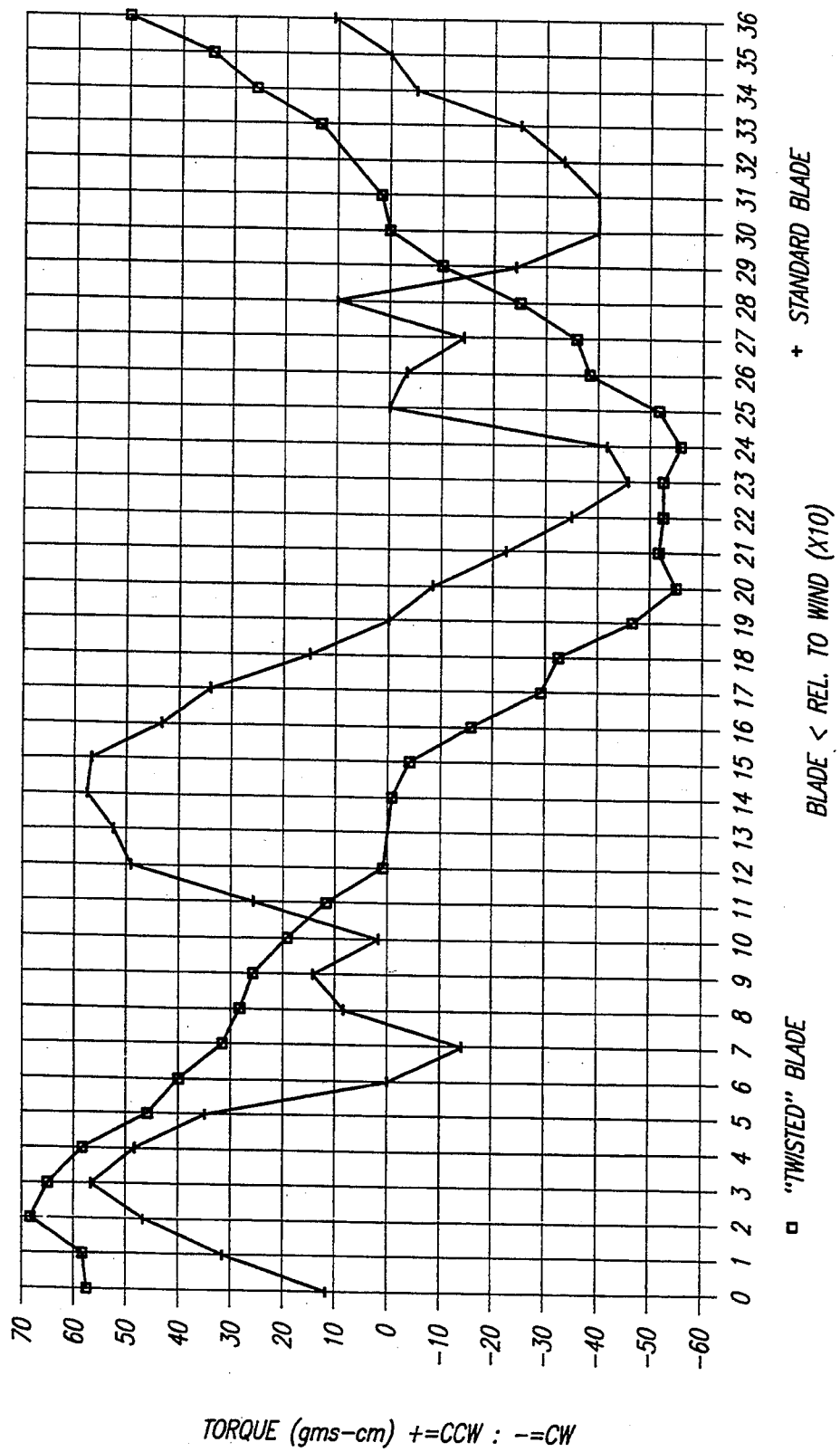
FIG. 5 shows in graph form experimental results of a test in which the torque generated by a VAWT with a conventional blade configuration is compared with the torque generated by a "twisted" blade VAWT according to the invention.

FIG. 5 illustrates the results of this comparison test. The x-axis in FIG. 5 is graduated in tens of degrees of blade angle relative to the wind, and the y-axis is the measured "torque" (in centimeter-grams). Positive torque values represent counter-clockwise torque and negative torque values represent clockwise torque. For the VAWT according to the invention, since the angular position of the blade differs over the length of the blade, the angular position of the upper end of the blade was measured. The values obtained for the conventional blade configuration are plotted with crosses "+" and the values for a 90° twisted blade configuration according to the invention are plotted as boxes "□".

As FIG. 5 shows, the conventional blade exhibited several localized torque "peaks", as well as at least six "null" positions. The twisted blade configuration according to the invention, however, had a much smoother torque profile over the entire 360° range of relative wind angle, with only two null positions. Furthermore, although the twisted blade showed two local torque peaks or extrema at approximately the 200° and 240° positions, these local peaks were not sharp, that is, they did not represent a significant unloading between peaks, so that the impulsive impact of the peaks was minimal.

It is believed that one reason the invention is able to generate a much smoother torque profile is that it is possible using a twisted blade for one portion of the twisted blade to generate lift at the same time that another portion generates drag. This lessens the abruptness of the change between drag and lift associated with conventional designs, and it also means that the twisted blade as a whole may be generating torque even though one portion of the blade may be at a torque "null". It has been observed that, using the teardrop cross section with a 90° blade twist, the blade according to the invention generates lift principally when it is downstream relative to the rotor tower 10, but drag when it is upstream. Both lift and drag contribute to torque generation. Another hypothesized reason that the invention generated torque much more smoothly is that, for most rotational positions, the twisted blade exposed a greater blade chord to the windstream than the standard blade did.

Tests have also indicated that the VAWT according to the invention will typically require much less external starting force than conventional designs, and in most cases it will be self-starting at lower wind speeds than conventional designs. First, the VAWT according to the invention has less "non-working" moving mass than most conventional VAWTs. Conventional struts, for example, add to the moment of inertia of the turbine but do not help generate torque other than to increase the moment arm of the blades. Second, there is almost always some portion of each twisted blade according to the invention that is generating torque in the proper direction, and, as the results shown in FIG. 5 illustrate, there are fewer angular null positions in which a blade can become "stuck".

Although the invention is described above with reference to its use in generating electricity, the twisted blade configuration according to the invention may of course be used in other applications, in which the force of the wind is to be converted to torque on a shaft to do other types of work. For example, as is indicated above, the invention would provide its advantages to the designer of a rural water-pumping device, whereby the rotation of the blades is used to drive a pump or bucket Arrangement mechanically.

I claim:

1. A vertical-axis wind turbine, comprising:
a rotor tower defining an axis of rotation;
a generator including a shaft;
a mechanical arrangement for coupling the shaft and the rotor tower; and
a plurality of substantially rigid, generally S-shaped blades, each of the blades defining a length and upper and lower end portions mechanically coupled to the rotor tower, the upper portion of each blade being offset about the axis of rotation relative to the lower portion when the rotor tower is not rotating.

2. A vertical-axis wind turbine as claimed in claim 1, wherein a radial distance of each blade from the axis of rotation over the length of the blade approximates a troposkein.

3. A vertical-axis wind turbine as claimed in claim 1, wherein each of the blades are twisted about three orthogonal axes over the length of the blade.

4. A vertical-axis wind turbine as claimed in claim 1, wherein each of the blades defines a cord length and a thickness, a ratio between the chord length and the thickness being substantially constant over the length of the blades.

5. A vertical-axis wind turbine as claimed in claim 4, wherein the chord length of each blade at a point approximately half-way between the upper and lower end portions is substantially between 70% and 90% of the cord length at the upper and lower end portions.

6. A vertical-axis wind turbine as claimed in claim 1, wherein each blade is shaped substantially as a section of a surface of rotation, the surface of rotation being defined by a rotation of a generating line connected at upper and lower end portions of the rotor tower.

7. A vertical-axis wind turbine as claimed in claim 6, wherein each of the blades defines a chord, the respective chords defining substantially constant angles relative to the surface of rotation.

8. A vertical-axis wind turbine, comprising:
a rotor tower defining an axis of rotation;
a generator including a shaft;
a mechanical arrangement for coupling the shaft and the rotor tower and
a plurality of substantially rigid, generally S-shaped blades, each blade defining a longitudinal axis, a length, a chord length and a thickness, each of the blades defining upper and lower end portions mechanically coupled to the rotor tower, the upper portion of each blade being offset about the axis of rotation relative to the lower portion when the rotor tower is not rotating, a radial distance from the axis of rotation to each blade along the length of each blade approximating a troposkein, each blade being twisted about three orthogonal axes over the length of the blade and a ratio between the chord length and the thickness being substantially constant over the length of each blade.

* * * * *